(12) United States Patent
Amigo (10) Patent No.: US 10,882,528 B2
(45) Date of Patent: Jan. 5, 2021

(54) METHOD AND SYSTEM FOR AUXILIARY POWER GENERATION

(71) Applicant: BLACKBURN ENERGY, INC., Somerville, MA (US)

(72) Inventor: Andrew Amigo, Somerville, MA (US)

(73) Assignee: BLACKBURN ENERGY, INC., Somerville, MA (US)

( * ) Notice: Subject to any disclaimer, the term of this patent is extended or adjusted under 35 U.S.C. 154(b) by 0 days.

(21) Appl. No.: 16/356,854

(22) Filed: Mar. 18, 2019

(65) Prior Publication Data

US 2019/0210602 A1 Jul. 11, 2019

Related U.S. Application Data

(63) Continuation of application No. 15/320,117, filed as application No. PCT/US2016/030123 on Apr. 29, 2016, now Pat. No. 10,239,534.

(Continued)

(51) Int. Cl.
*B60W 30/188* (2012.01)
*B60K 25/06* (2006.01)
(Continued)

(52) U.S. Cl.
CPC .............. *B60W 30/188* (2013.01); *B60K 6/40* (2013.01); *B60K 6/48* (2013.01); *B60K 17/22* (2013.01);
(Continued)

(58) Field of Classification Search
CPC ......... B60W 30/188; B60W 2550/142; B60W 2540/10; B60W 2550/406;
(Continued)

(56) References Cited

U.S. PATENT DOCUMENTS 1,858,700 A 5/1932 Walter
2,051,784 A * 8/1936 Davey .................... B60K 17/28
180/53.1

(Continued)

FOREIGN PATENT DOCUMENTS

JP 2003307270 A * 10/2003 ............. B60L 1/003
WO 2015029075 A2 3/2015

OTHER PUBLICATIONS

Supplementary European Search Report for EP 16789836; dated Nov. 28, 2018.

(Continued)

*Primary Examiner* — Darlene P Condra
(74) *Attorney, Agent, or Firm* — Nixon Peabody LLP; David F. Crosby; Francis de Rege (57) ABSTRACT

An auxiliary power system for a motor vehicle includes a power generator that generates electricity to charge one or more auxiliary power system batteries. The motor vehicle includes an engine and drive train that distributes power from the engine to the drive wheels. The drive train can include a transmission, a drive shaft and a differential that connects the engine to the drive wheels. The power generator can be connected to the drive train (e.g., the transmission, the drive shaft or the differential) to draw power to generate electricity as well as to apply braking loads on the drive wheels to increase the ability to stop the motor vehicle.

15 Claims, 9 Drawing Sheets

US 10,882,528 B2
Page 2

Related U.S. Application Data (60) Provisional application No. 62/155,855, filed on May 1, 2015.

(51) Int. Cl.

| | | |
|---|---|---|
| *B60K 17/24* | (2006.01) | |
| *F02N 11/06* | (2006.01) | |
| *B60W 10/00* | (2006.01) | |
| *B60K 6/48* | (2007.10) | |
| *B60K 6/40* | (2007.10) | |
| *B60W 10/08* | (2006.01) | |
| *B60W 30/18* | (2012.01) | |
| *B60W 10/26* | (2006.01) | |
| *B60K 17/28* | (2006.01) | |
| *B60W 20/14* | (2016.01) | |
| *B60L 50/15* | (2019.01) | |
| *B60L 50/16* | (2019.01) | |
| *B60K 17/22* | (2006.01) | |
| *B60L 7/10* | (2006.01) | |
| *B60L 7/20* | (2006.01) | |
| *F02N 15/08* | (2006.01) | |
| *F02N 11/04* | (2006.01) | |

(52) U.S. Cl.
CPC ............. *B60K 17/24* (2013.01); *B60K 17/28* (2013.01); *B60K 25/06* (2013.01); *B60L 7/10* (2013.01); *B60L 7/20* (2013.01); *B60L 50/15* (2019.02); *B60L 50/16* (2019.02); *B60W 10/00* (2013.01); *B60W 10/08* (2013.01); *B60W 10/26* (2013.01); *B60W 20/14* (2016.01); *B60W 30/1888* (2013.01); *B60W 30/18127* (2013.01); *F02N 11/06* (2013.01); *B60K 2006/4808* (2013.01); *B60K 2006/4816* (2013.01); *B60K 2006/4833* (2013.01); *B60W 2510/0604* (2013.01); *B60W 2510/0638* (2013.01); *B60W 2510/0657* (2013.01); *B60W 2510/242* (2013.01); *B60W 2520/105* (2013.01); *B60W 2540/10* (2013.01); *B60W 2552/15* (2020.02); *B60W 2552/20* (2020.02); *B60W 2556/60* (2020.02); *B60W 2710/083* (2013.01); *B60W 2710/085* (2013.01); *B60W 2710/242* (2013.01); *F02N 11/04* (2013.01); *F02N 15/08* (2013.01); *Y02T 10/62* (2013.01)

(58) Field of Classification Search
CPC . B60W 2710/242; B60K 17/22; B60K 17/24; B60K 25/06
See application file for complete search history.

(56) References Cited

U.S. PATENT DOCUMENTS

| | | | |
|---|---|---|---|
| 2,987,134 A | 6/1961 | Myers | |
| 3,874,472 A | 4/1975 | Deane | |
| 3,982,443 A * | 9/1976 | Fitch | B60K 25/02 74/15.88 |
| 4,222,450 A | 9/1980 | Fobbs | |
| 4,406,633 A * | 9/1983 | Hamm | B63J 3/02 192/69.91 |
| 4,422,656 A | 12/1983 | Kaplan et al. | |
| 4,477,764 A | 10/1984 | Pollard | |
| 5,535,715 A | 7/1996 | Mouton | |
| 5,562,566 A | 10/1996 | Yang | |
| 6,717,281 B1 | 4/2004 | Brandon et al. | |
| 7,105,973 B2 | 9/2006 | Hoppe et al. | |
| 7,547,980 B2 | 6/2009 | Harrison | |
| 7,681,676 B2 | 3/2010 | Kydd | |
| 7,779,628 B2 * | 8/2010 | Petre | B60K 6/12 60/413 |
| 7,992,662 B2 | 8/2011 | King et al. | |
| 8,596,494 B2 | 12/2013 | Jones | |
| 8,670,888 B1 | 3/2014 | Breenner | |
| 8,833,337 B2 | 9/2014 | Xykis et al. | |
| 2006/0003657 A1 | 1/2006 | Larson et al. | |
| 2006/0030450 A1 | 2/2006 | Kyle | |
| 2007/0001616 A1 | 1/2007 | Puccetti | |
| 2007/0215430 A1 | 9/2007 | Graves | |
| 2007/0261902 A1 | 11/2007 | Margoudakis | |
| 2008/0205809 A1 | 8/2008 | Lin et al. | |
| 2008/0318726 A1 | 12/2008 | Matsubara | |
| 2009/0044992 A1 | 2/2009 | Kokot et al. | |
| 2009/0166113 A1 | 7/2009 | Luo et al. | |
| 2009/0288899 A1 * | 11/2009 | Belloso | B60K 5/08 180/69.6 |
| 2010/0081541 A1 * | 4/2010 | Sugai | B60K 6/445 477/5 |
| 2010/0091541 A1 | 4/2010 | Sugai | |
| 2010/0105519 A1 | 4/2010 | Kasuya et al. | |
| 2011/0246005 A1 | 10/2011 | King et al. | |
| 2011/0288706 A1 | 11/2011 | Okamura | |
| 2012/0109480 A1 | 5/2012 | Morimura | |
| 2012/0255798 A1 | 10/2012 | Palmer | |
| 2013/0075183 A1 * | 3/2013 | Kochidomari | B60K 6/40 180/292 |
| 2013/0138288 A1 | 5/2013 | Nickolaou et al. | |
| 2013/0296125 A1 * | 11/2013 | Gibson | B60W 20/10 477/5 |
| 2014/0113766 A1 * | 4/2014 | Yagyu | B60W 20/30 477/5 |
| 2014/0195137 A1 * | 7/2014 | Fischer | B60K 6/442 701/110 |
| 2016/0272191 A1 | 9/2016 | Atluri et al. | |

OTHER PUBLICATIONS

Anonyomous, "Making the Right Shaft Connections | Machine Design", https://www.machinedesign.com/mechanical-motion-systems/article/21834525/making-the-right-shaft-connections, (2000).

* cited by examiner

METHOD AND SYSTEM FOR AUXILIARY POWER GENERATION

CROSS-REFERENCE TO RELATED APPLICATIONS

This application is a Continuation Application of U.S. application Ser. No. 15/320,117 which is a 35 U.S.C § 371 National Phase Entry Application of International Application No. PCT/US16/30123 filed Apr. 29, 2016, which designates the U.S., and which claims any and all benefits as provided by law including benefit under 35 U.S.C. § 119(e) of the U.S. Provisional Application No. 61/155,855, filed May 1, 2015, the contents of which are incorporated herein by reference in its entirety.

STATEMENT REGARDING FEDERALLY SPONSORED RESEARCH

Not Applicable.

REFERENCE TO MICROFICHE APPENDIX

Not Applicable

BACKGROUND

Technical Field of the Invention

The present invention is directed to auxiliary power generation systems for motor vehicles. And, more specifically, to auxiliary power generation systems that derive energy from the vehicle power train and store the energy (e.g. electrical energy) in energy storage elements (e.g. batteries) for use when the engine of the motor vehicle is not used. The present invention can also be used to provide propulsion to the vehicle (e.g., electric motor driven vehicles) as well as provide a new form of reliable and consistent supply of electricity for vehicle subsystems.

Description of the Prior Art

Motor vehicles are increasingly incorporating electronic components in both the drivetrain components and the passenger compartment for passenger comfort. These include, for example, electric cooling fans and electric fluid pumps that are lighter weight and can be turned off to reduce fuel consumption but still result in a parasitic loss of fuel economy when in use. The use of these and other electrical components is driving the demand for more electrical energy and larger electrical storage. This applies to both passenger motor vehicles and motor homes, as well as the tractor-trailers used for long and short haul trucking. The need for electricity in large trucks is also growing as the demand from more electric components and battery based systems grows. It is estimated that the use these electric components (e.g., electric fuel pumps, power steering pumps, cooling fans, and the like) result in a 5-7% (parasitic) loss of fuel economy by operating these subsystems on the main truck engine.

In some ways, the need for electrical energy is greater in motor vehicles that provide accommodations for drivers and/or passengers, such as large trucks and motor homes because these vehicles typically need to provide passenger comfort for extended periods of time, including overnight stays when turning off the main engine is either required or desirable. These vehicles primarily derive energy from an alternator connected to the main engine, thus making it necessary to keep the main engine running to heat and/or cool the accommodations, even when the vehicle is not moving. This wastes fuel and contributes to air pollution.

In addition, a raft of environmental legislation has made idling the main truck engine to operate the sleeper cab heat and air conditioning a prohibited practice. As a result battery based air conditioning and heat systems have emerged, however they lack the capacity to efficiently generate electricity sufficient to run these systems on batteries for extended periods of time. A need exists in the art for a new more efficient, dedicated power source for vehicles, in particular large class 8 trucks.

SUMMARY

The present invention is directed to methods and systems for supplying power to auxiliary power systems in motorized vehicles. Prior art systems draw vehicle electric power from an alternator connected by a belt and pulley to the front end of the engine's crank shaft. It is generally assumed that generating power from either the front of an internal combustion engine or the back of the engine nets the same efficiency and power dynamics. While theoretically true, the power dynamics on the output side of the transmission are substantially different due to the gearing effect of the transmission. In accordance with some embodiments of the invention, an auxiliary power system (including an alternator or generator) is designed and constructed to take advantage of the transmission gearing to spin the output shafts at higher speeds and with greater torque during on road operation.

In accordance with some embodiments of the invention, the motor vehicle includes an engine connected to a transmission that drives a drive line or drive shaft that drives the drive wheels that propel the vehicle and a generator (or alternator) can be coupled to the transmission or the drive shaft. Power from the transmission or the drive shaft can be used to power the generator (or alternator) to produce electrical energy that can be stored in the energy storage elements (e.g. batteries) of the auxiliary power system as well as to power electrical components of the vehicle. The generator (or alternator) can be selectively controlled by a control system to provide efficient operation and for functions such as regenerative braking of the motor vehicle (e.g., by selectively engaging by a clutch or selectively activating the stator of the generator or alternator).

In accordance with some embodiments of the invention, the system is optimized for the dynamics of long highway trips like that of a long haul truck. At highway speeds the engine RPM lowers below the RPM of the driveshaft attached to the output shaft of the transmission. In accordance with some embodiments of the invention, an electricity generating component (e.g., an alternator or a generator) takes power from the rotation of the drive shaft providing higher RPM and more electricity at highway speeds. In addition, the system according to the invention can be used in regenerative braking mode which creates electricity by slowing of the vehicle using the added resistance of the alternator or generator.

In accordance with implementations of the invention, one or more of the following capabilities may be provided.

It is one of the objects of the invention to provide a system that more efficiently draws energy from the motor of a motor vehicle.

It is one of the objects of the invention to provide a system that efficiently draws energy from the drive train of a motor vehicle.

It is one of the objects of the invention to provide a system that enables energy from the drive train to be used to power an auxiliary power system.

It is one of the objects of the invention to provide a system that enables energy from the drive train to be used to power a generator or alternator to charge batteries of an auxiliary power system.

These and other capabilities of the invention, along with the invention itself, will be more fully understood after a review of the following figures, detailed description, and claims.

BRIEF DESCRIPTION OF THE FIGURES

The accompanying drawings, which are incorporated into this specification, illustrate one or more exemplary embodiments of the inventions and, together with the detailed description, serve to explain the principles and applications of these inventions. The drawings and detailed description are illustrative, and are intended to facilitate an understanding of the inventions and their application without limiting the scope of the invention. The illustrative embodiments can be modified and adapted without departing from the spirit and scope of the inventions.

DETAILED DESCRIPTION OF PREFERRED EMBODIMENTS

The present invention is directed to methods and systems for supplying power, such as electrical energy, to auxiliary power systems, for use in powering electrical systems in motorized vehicles. In accordance with some embodiments of the invention, the motor vehicle includes an engine connected to a transmission that drives a drive shaft and powers the drive wheels that propel the vehicle and a generator (or alternator) can be coupled to the transmission or the drive shaft. Power from the transmission or the drive shaft can be used to power (e.g. turn) the generator (or alternator) to produce electrical energy that can be stored in an array of batteries of the auxiliary power system as well as to power electrical components of the vehicle. The generator (or alternator) can be controlled to provide regenerative braking of the motor vehicle.

Figure 1:
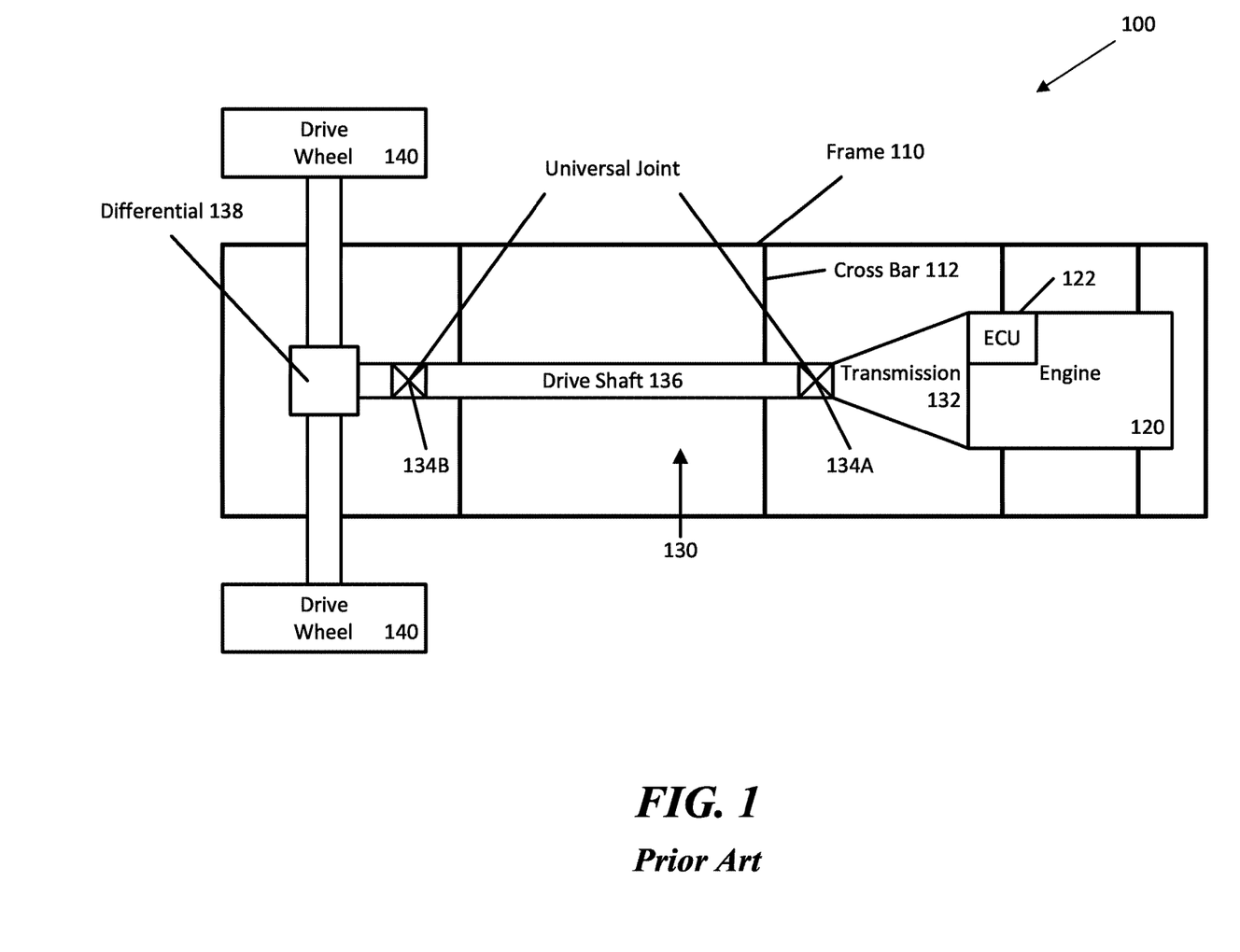
FIG. 1 is a diagrammatic view of a motor vehicle according to the prior art.

FIG. 1 shows a diagrammatic view of a motorized vehicle 100 known in the prior art. The motorized vehicle 100 includes a chassis or frame 110 having one or more cross bars 112 that serve to support and align the other components, such as the engine 120 and drive train 130 (e.g., transmission 132, drive shaft 136 and differential 138). The frame 110 can be a separate structure or be integrated into a carriage or passenger compartment. The drive train 130 includes the transmission 132, the drive shaft 136 and the differential 138. The transmission 132 is coupled to the engine 120 and the drive shaft 136 connects the transmission 132 to the differential 138 and drive wheels 140. In general, the engine 120 is securely coupled to the transmission 132 and the combined engine 120 and transmission 132 are movably coupled to the frame by motor mounts (not shown) that absorb vibration and enable the engine 120 and transmission 132 to move a small amount with respect to the frame 110 while transferring large amounts of torque to the drive shaft 136, differential 138 and wheels 140. The motorized vehicle can include a suspension system (not shown) that enables the drive wheels 140 to move relative to the frame 110 to absorb road shocks and enable the drive wheels 140 to maintain traction with an uneven road surfaces. In order to accommodate the motion of the drive wheels 140 relative to the frame 110, universal joints 134A and 134B can be used to connect the front end of the drive shaft 136 to the transmission 132 and connect the rear end of the drive shaft 136 to the differential 138. The universal joints 134A and 134B enable the transfer for rotational power of the transmission 132 to be transmitted to the drive shaft 136 and the differential 138 while the differential 138 and drive wheels 140 move relative to the frame 110 and the transmission 132.

Figure 2:
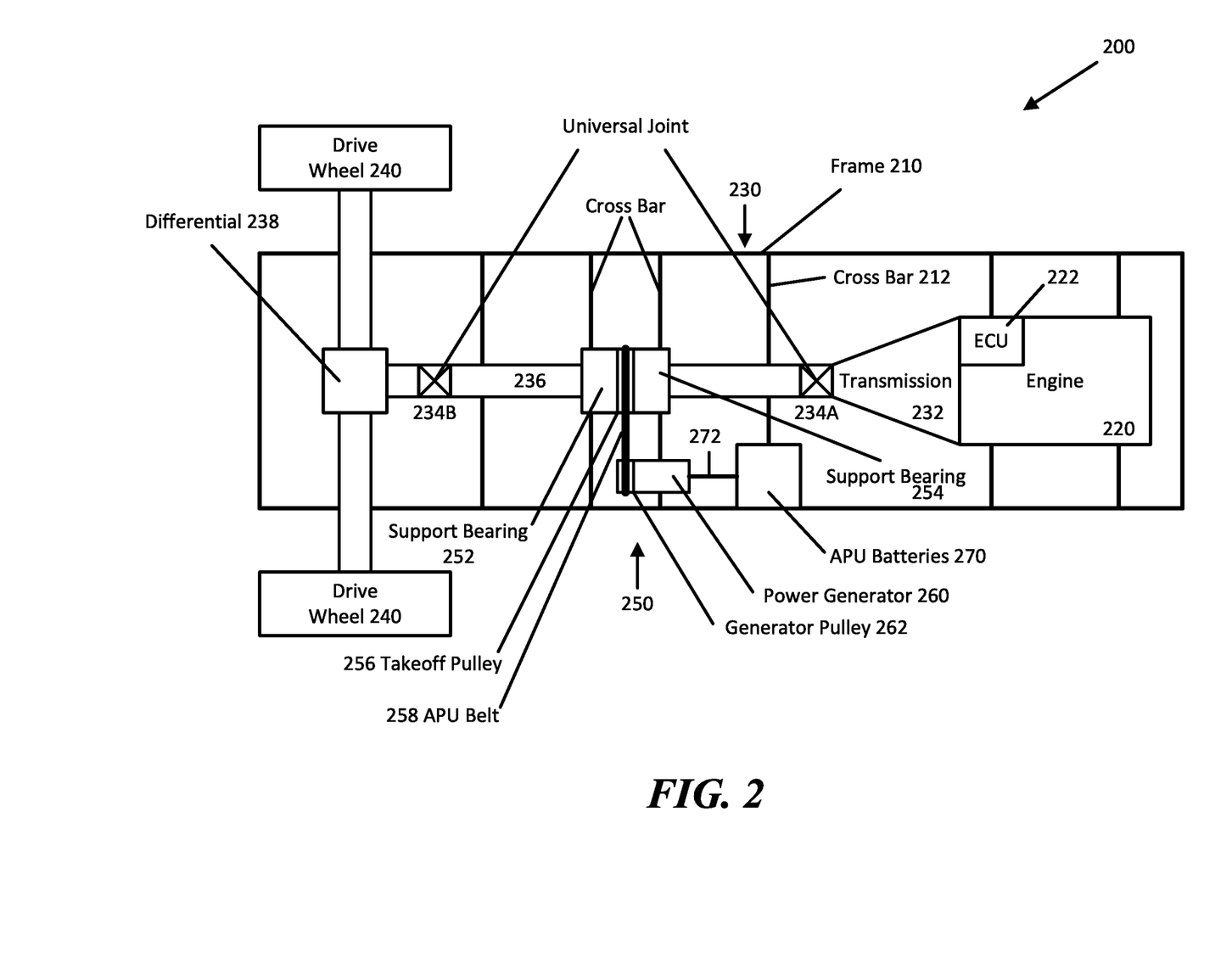
FIG. 2 is a diagrammatic view of a motor vehicle according to some embodiments of the invention.

FIG. 2 shows a diagrammatic view of a motorized vehicle 200 according to some embodiments of the invention. In accordance with some embodiments of the invention, the motorized vehicle 100 such as shown in FIG. 1 can be modified to accommodate a power generator 260 (e.g. a generator or an alternator) that can be coupled to and draw power from the drive shaft 236 to produce electricity that can be stored in APU batteries 270. The engine 220 (e.g., a gasoline or diesel motor) can be mounted the frame 210. The engine 220 can be coupled to the drive train 230 that transfers power from the engine 220 to the drive wheels 240. The drive train 230 includes the transmission 232, front universal joint 234A, drive shaft 236, rear universal joint 234B and differential 238 which includes drive axles that are connected to the drive wheels 240. The drive axles can include universal joints as part of independent drive suspension system. In accordance with some embodiments of the invention, the differential 238 can be moveably coupled to the frame such as by a suspension system (e.g., springs and shock absorbers, not shown) to enable the drive wheels 240 to move relative to the frame to absorb vibration and maintain contact with uneven road surfaces. The front universal joint 234A and the rear universal joint 234B enable differential 238 to move while the drive shaft 236 transfers torque (and power) from the transmission 232 to the drive wheels 240. The drive shaft 236 is moveable with respect to the frame to accommodate movements of the differential 236 and drive wheels 240. In order to couple power generator 260 to the drive shaft 236, a drive pulley 256 can be mounted (e.g., using splines, a key and keyway, a pin, or by press fitting) to a portion of the drive shaft 236 and an APU belt 258 can couple the drive pulley 258 to the generator pulley 262. In addition, support bearings 252 and 254 can be mounted to the frame 210 (e.g., on cross bars 212) and support the drive shaft 236 to prevent the APU belt 258 from pulling the drive shaft 236 out of alignment and possibly damage the universal joints 234A and 234B.

FIG. 2 shows a diagram of a power take off system 250 that is installed into the driveline. In accordance with some embodiments, the power take off system 250 includes the drive pulley 256 surrounded by support bearings 252 and 254 that replaces the main center bearing on the drive shaft 236 of a conventional motor vehicle (e.g. truck) drive train. The power take off system 250 performs the functions of the center bearing and enables power to be taken from the drive shaft to drive a generator or alternator. The unit consists of a drive element 256 (e.g., a pulley, sprocket, or ring and pinion gearing) surrounded on either side by at least one bearing (e.g., support bearings 252 and 254). The drive element 256 can be made of chrome molybdenum, vanadium steel, stainless steel or aluminum, as well as other high strength metal allows. The bearings can be either ball bearings, roller bearings, ball thrust bearings, roller thrust bearings or tapered roller thrust bearings (or combinations thereof) and can be configured according to a plurality of embodiments to accommodate the support and load requirements of the drive line configuration of the motor vehicle. In accordance with some embodiments of the invention, the support bearings 252, 254 located on either side of the drive element 256 (e.g., pulley, sprocket, or ring and pinion gearing) can be mounted in or encased in a bushing (or bushing system) which can be compressed in a exoskeleton which is mechanically attached to the trucks frame 210. The bushing can be made from a resilient compressible material such as, neoprene, rubber, silicone, urethane, polyurethane, or any number of combinations thereof. In some configurations, depending on the density of the bushing material and the desired application, the bushing material can include one or more relief cuts (e.g., radially extending voids) in the material which further allows the material to flex. The role of the bushing is to absorb vehicle vibration, to help align the two shafts and to allow the system to flex with vehicle movement. The tube shaft inserts the male end through the unit with a yoke on one end and the drive shaft on the other. The yoke can be attached via standard universal joint to another yoke and the other drive shaft.

In accordance with some embodiments, a belt 258 can be looped around the drive pulley 256 on one end and around a generator pulley 262 attached to the shaft of a generator/alternator 260. In accordance with some embodiments, the drive pulley 256 can be replaced with a drive sprocket 256 and a chain 258 that drives a generator sprocket 262 attached to the shaft of a generator/alternator 260. The belt or chain can be tensioned through the use of a spring loaded tensioner (not shown) calibrated to a range of horizontal force applied across the vertical axis of the spinning shaft.

Auxiliary Power Unit (APU) System includes the power generator (or alternator) 260 which can be connected by wires 272 to the APU battery pack 270. The APU battery pack 270 can include an array of batteries and a charging control circuit that can control the charging parameters of the system to maximize charging efficiency and minimize harm (e.g., such as over-charging) to the batteries. In accordance with some embodiments, the charging control circuit can be a separate component from the battery pack 270.

Figure 3:
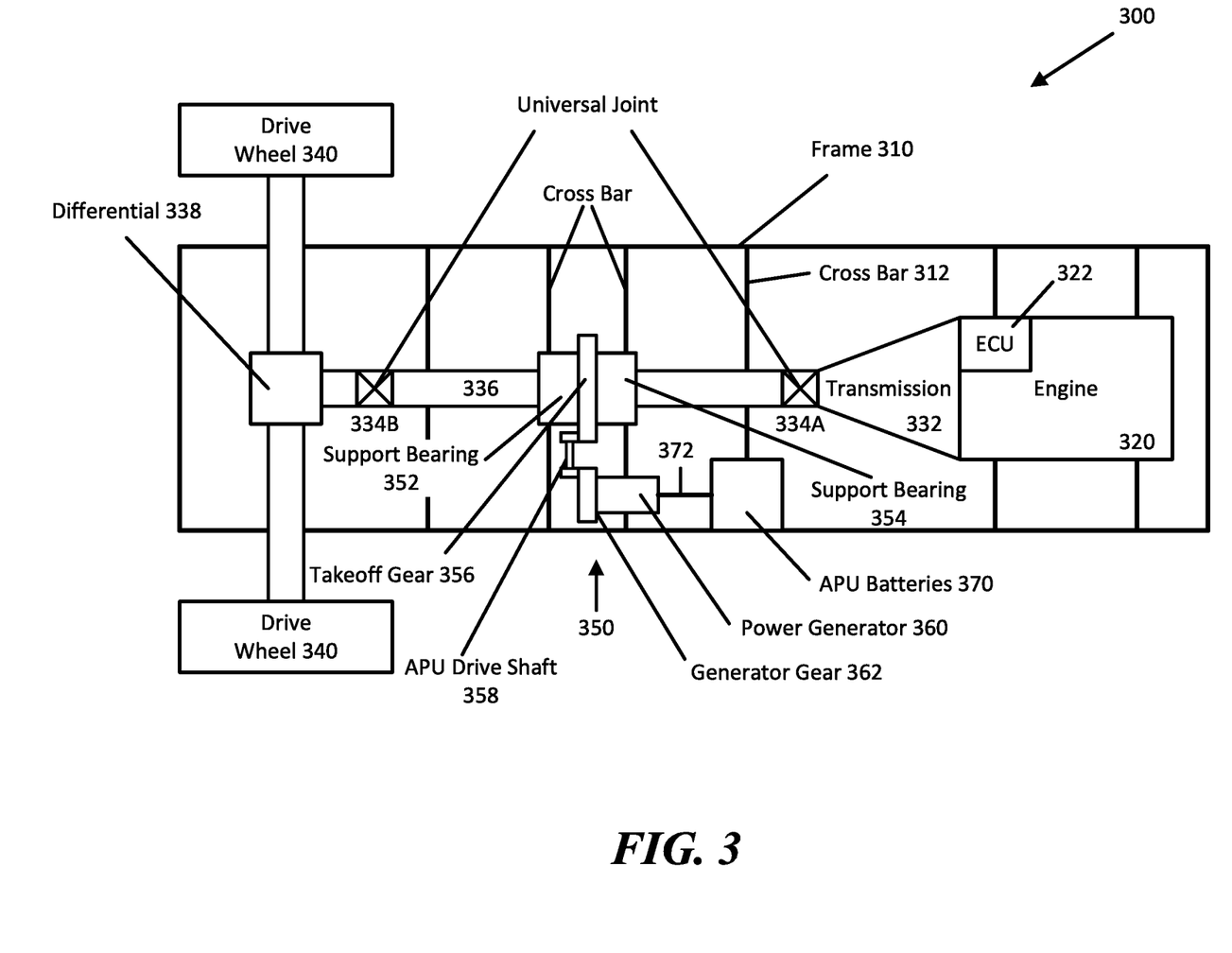
FIG. 3 is a diagrammatic view of a motor vehicle according to some embodiments of the invention.

FIG. 3 shows a diagrammatic view of a motorized vehicle 300 according to some embodiments of the invention. The motorized vehicle 300 shown in FIG. 3 is essentially the same as FIG. 2, however in this embodiment of the invention, the power generator 360 is coupled to drive shaft by an APU drive shaft 358 instead of an APU drive belt 258. In this embodiment, the power generator 360 is coupled to the drive shaft 336 by a drive gear 356 can be mounted (e.g., using splines, a key and keyway, a pin, or by press fitting) to a portion of the drive shaft 336 and an APU drive shaft 358 can be used to couple the drive gear 358 to the generator gear 362. In addition, support bearings 352 and 354 can be mounted to the frame 310 (e.g., on cross bars 312) and support the drive shaft 336 to prevent the APU drive shaft 358 from forcing the drive shaft 336 out of alignment and possibly damage the universal joints 334A and 334B.

Figure 3A:
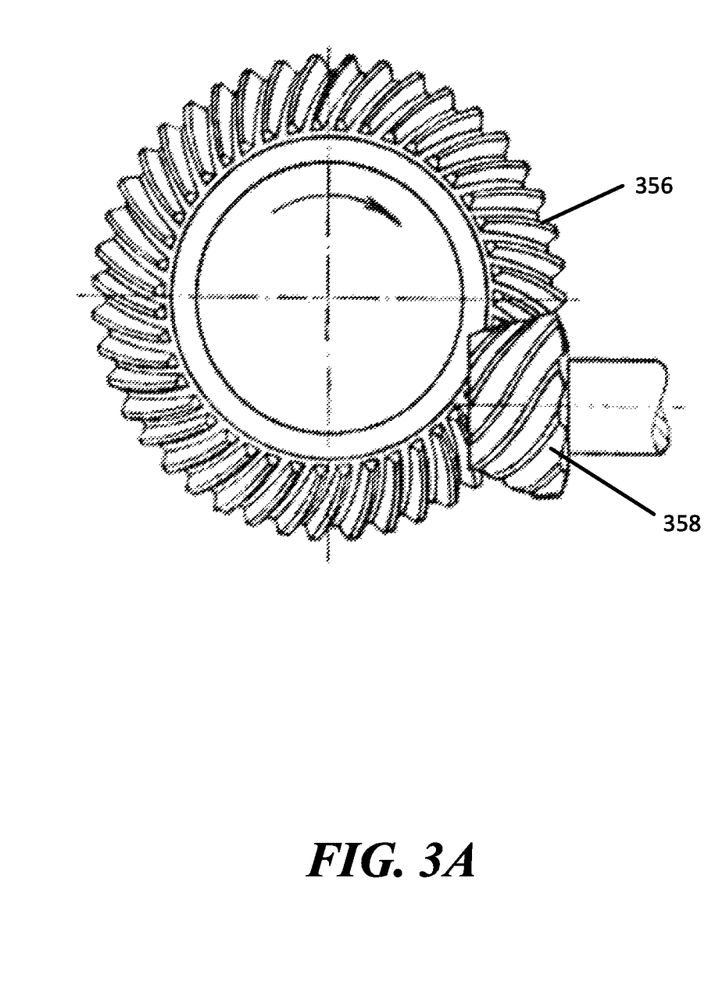
FIG. 3A is a diagram of a drive gear and a pinion gear according to some embodiments of the invention.

As shown in FIG. 3A, the drive gear 356 can include a spiral bevel gear with helical teeth. The spiral gear can be configured in a conical or hypoid design. Alternatively, the drive gear 356 can include a crown gear or a ring. The drive gear 356 can be connected to a drive shaft or pinion shaft 358 by a matching gear 358A at a 90 degree angle. The pinion shaft 358 can be connected to the power generator 360. In accordance with some embodiments, the pinion shaft 358 can include a safety shaft to prevent a catastrophic failure of the pinion shaft 358 from damaging the drive shaft 336 or the drive train 360. The safety shaft can include a solid output shaft is inserted into a hollow tube which is connected to the generator/alternator. A set of bearings (e.g., needle bearings) can be installed on the solid shaft and the hollow tube shaft can positioned over the solid shaft with the greased bearings. The hollow tube shaft covers at least a portion of the solid shaft and bearings. The two shafts can be connected by a series of shear pins that are inserted through both shafts and bolted into place. The shear pins are selected to shear when the torque applied exceeds acceptable levels.

Figure 4:
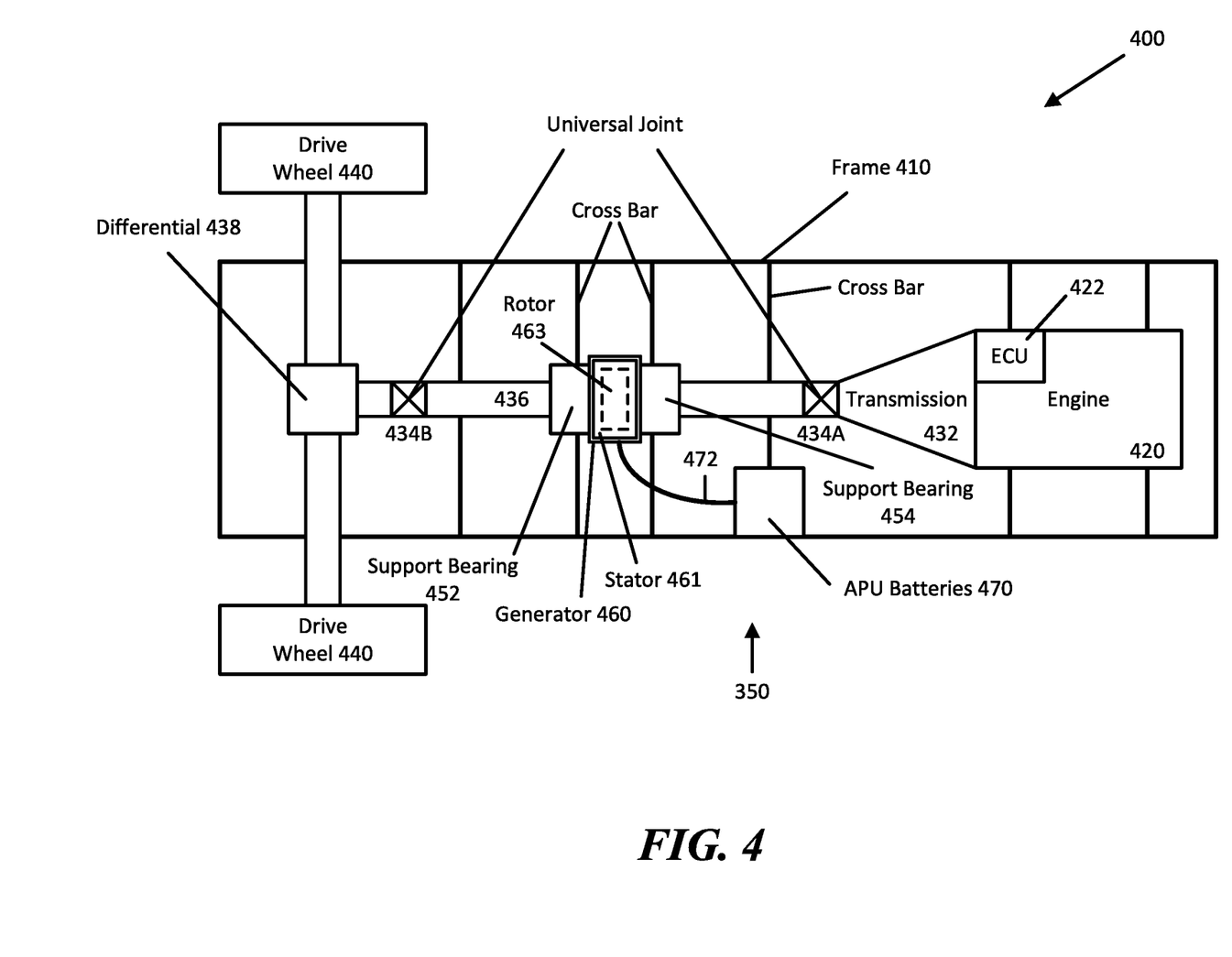
FIG. 4 is a diagrammatic view of a motor vehicle according to some embodiments of the invention.

FIG. 4 shows a diagrammatic view of a motorized vehicle 400 according to some embodiments of the invention. The motorized vehicle 400 shown in FIG. 4 is essentially the same as FIG. 2, however in this embodiment of the invention, the power generator 460 is mounted directly on the drive shaft 436. The magnetized rotor of the power generator 460 can be fastened to the drive shaft 436 and the stator of the power generator 460 can be coupled to the frame 410 through support bearings 452 and/or 454. The magnetized rotor rotates with the drive shaft 436 within the stator producing electricity that can be stored in the APU batteries 470 or used to power connected electric components.

Figure 5:
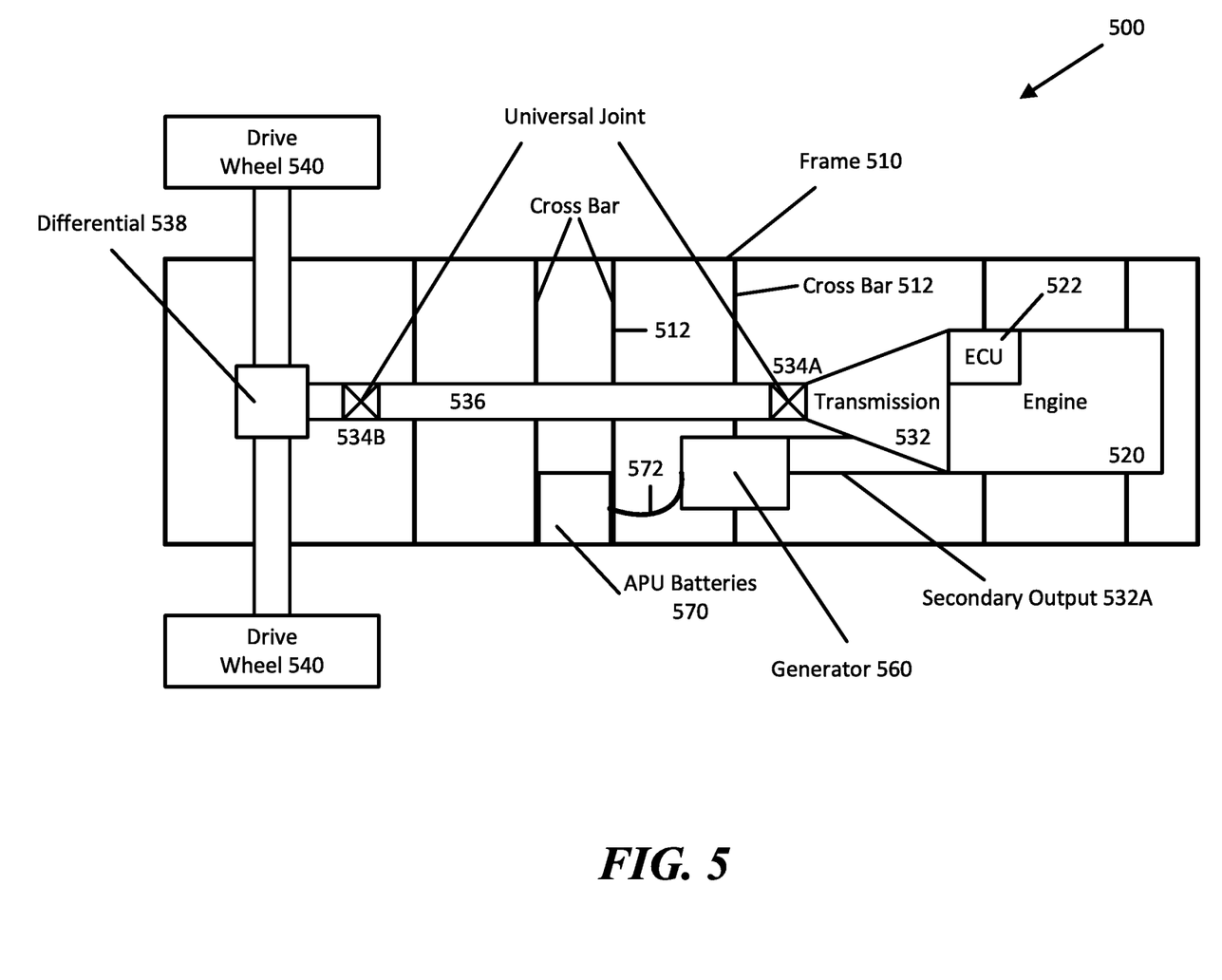
FIG. 5 is a diagrammatic view of a motor vehicle according to some embodiments of the invention.

FIG. 5 shows a diagrammatic view of a motorized vehicle 500 according to some embodiments of the invention. The motorized vehicle 500 shown in FIG. 5 is similar to the motorized vehicle 200 shown in FIG. 2, except that the transmission 532 has been modified to include a secondary output 532A that can be directly or indirectly coupled to the power generator 560. In accordance with some embodiments, the secondary output of the transmission 532 can include a drive gear or pulley 532A that engages a generator gear or pulley 562 that is coupled to the power generator 560. The power generator 560 can be mounted to the frame 510 or directly the transmission 532 (e.g., the transmission housing). In accordance with some embodiments, the transmission 532 can include a secondary output shaft 532A that can be coupled to the input shaft 562 of the power generator 560, such as using a drive shaft. In these embodiments, the power generator 560 generates electric energy that can be transferred by wire 572 to the APU battery pack 570.

Figure 6A:
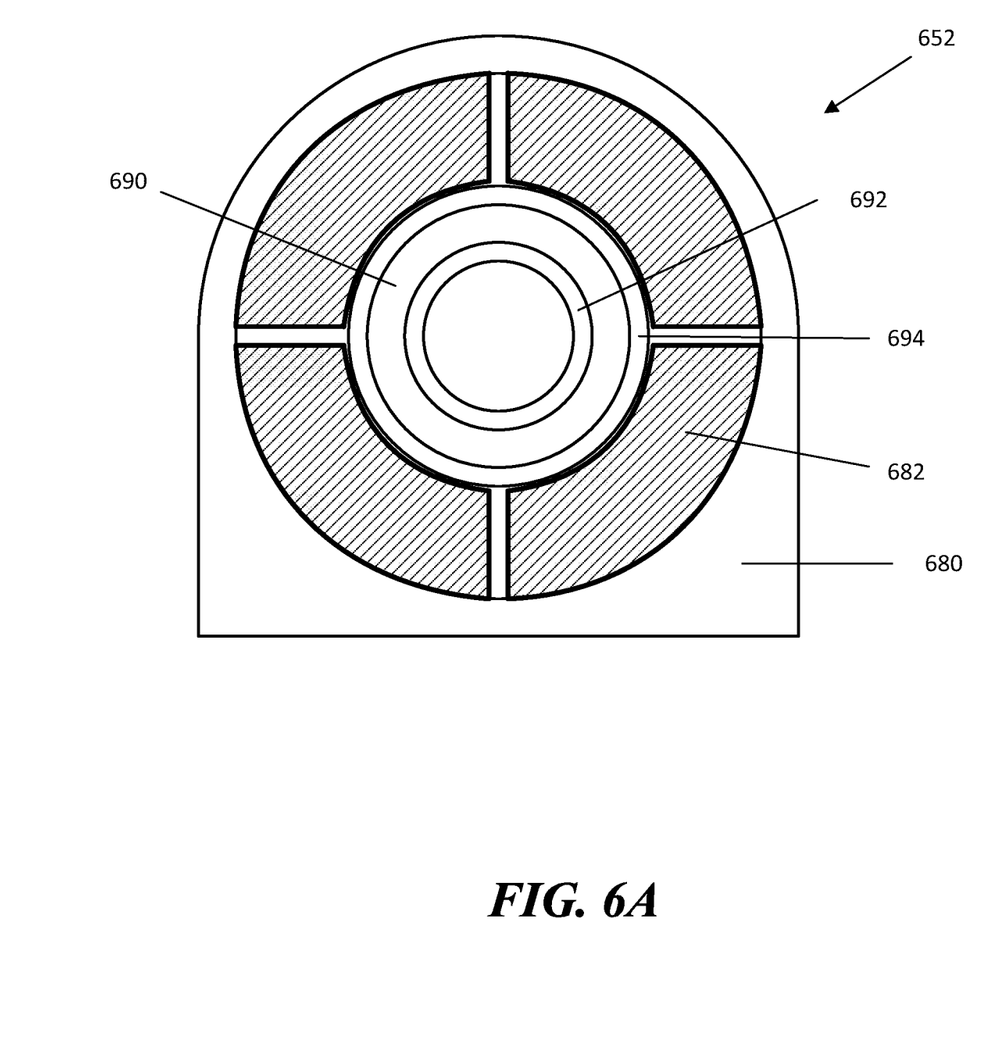
FIGS. 6A and 6B show diagrammatic views of a support bearing according to some embodiments of the invention.
Figure 6B:
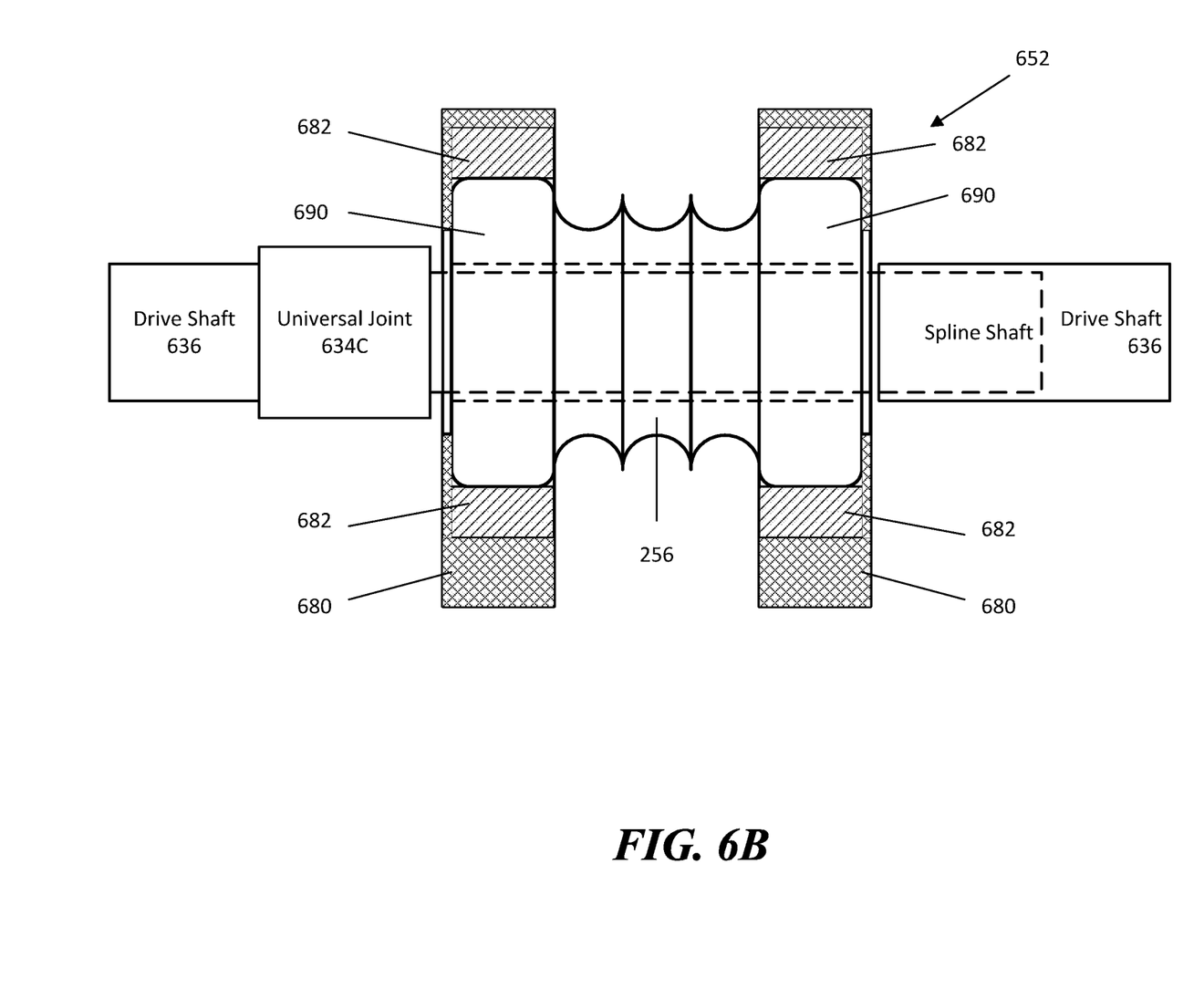

FIGS. 6A and 6B show diagrammatic views of a support bearing 652 according to some embodiments of the invention. In FIG. 6B, the support housing 690 has be sectioned to show the support bushing 682 inside. As shown in FIGS. 2, 3 and optionally in FIG. 4, the drive shaft 236, 336, 436, can be supported by support bearings 252, 254, 352, 354, 452, 454 that support the drive shaft 236, 336, 436 against the load of the power takeoffs, such as the drive pulley 256 or drive gear 356. In accordance with some embodiments of the invention, the support bearing 652 includes a support frame or housing 680 that includes a support bushing 682 and a bearing 690 (e.g., a ball bearing). The bearing 690 includes an inner race 692 that can be mounted (e.g., using splines, a key and keyway, a pin, or by press fitting) on the drive shaft 636 and an outer race 694 that can be supported by the support bushing 682. In accordance with some embodiments, the inner race 692 of the bearing 690 can include a spline that mates with a spline on the drive shaft 636. The spline on the drive shaft 636 can be spline that is used to connect the yoke of the universal joint 634C to the drive tube of the drive shaft 636. The support bushing 682 can be constructed of an elastomeric material (e.g., rubber, neoprene, or an elastic polymer). The support bushing 682 enables the bearing 690 to float or be movable within a range to accommodate lateral motion of the drive shaft 636 during normal use and at the same time support the drive shaft 636 against lateral loads imposed by the drive system that transfers power to the power generator 260, 360, 460. In operation, the support frame 680 of one or more support bearings 652 can be integrated into or fastened (e.g., by bolts or welding) to the frame 210, 310, 410 of the motorized vehicle 200, 300, 400 and the inner race 692 can be mounted to the drive shaft 636. The drive pulley 256 or drive gear 356 can be secured, such as by welding or other attachment methods to the inner race 692 of the bearing 690 forming a monolithic unit that is coupled to the drive shaft 636 to supply power to power generator 260, 360, 460. During normal use, as the drive shaft 636 moves laterally to accommodate movement of the drive wheels 240, 340, 440 relative to the frame 210, 310, 410, and the support bushing 682 can be compressed to accommodate movement of the bearing 690 as it supports the drive shaft 636.

In operation, the APU battery system can be used to power many of the electrical components of the motor vehicle during operation, either instead of or as a backup to the standard alternator connected to the engine that charges the ignition battery and some of the engine electronics. The APU battery system can also be used as backup system if the ignition battery fails. Further, the standard alternator can be selectively connected to APU battery system for charging during times when the vehicle can not be moved.

The power generator 260, 360, 460 drive system can include a drive belt 258, and one or more tensioning pulleys which can be spring loaded and the spring force can be adjustable using a bolt to compress or release the spring to bias the tension pulley against the drive belt 258. In accordance with some embodiments, a chain and sprocket drive system can be used instead of the belt and pulley system. In accordance with some embodiments, the drive pulley 252 and/or the generator pulley 262 can be adjustable as part of a continuously variable power transmission system to enable the power drawn from the drive shaft (or secondary output 532A) to be adjustable. In accordance with some embodiments of the invention, an adjustable transmission mechanism can be positioned between the drive shaft 236, 336, 436, or secondary output 532A and the power generator 260, 360, 460, 560. The adjustable transmission can include a chain sprocket drive mechanism, a gearing mechanism or combine of both. The adjustable transmission can enable the power take-off from the drive shaft 236, 336, 436 or the secondary output 532A to be adjusted according the needs of the system by adjusting transmission.

While the illustrative embodiments of the invention show the power generator 260, 360, 460 coupled to the drive shaft 236, 236, 436, in accordance with other embodiments of the invention, the drive pulley 256, or drive gear 356 can be coupled directly to the output shaft of the transmission 232, 332, 432 or the input shaft of the differential 238, 338, 438 without the need for additional support bearings. The power generator 260, 360, 460 can be mounted directly to transmission housing or the differential housing without using support bearings.

In accordance with some embodiments, the electric generator/alternator can be integrated into the yokes and universal joints of the driveshaft whereby the magnetic components of the electric generator/alternator can be mounted to the rotating yokes which are surrounded by a stator (e.g., one or more copper coils). As the magnetized yokes spin inside the stator they produce an electric charge which can be used to charge a battery. In addition, varying the electric load on stator can used to impede the rotation of the magnetized yokes to provide braking.

Figure 7:
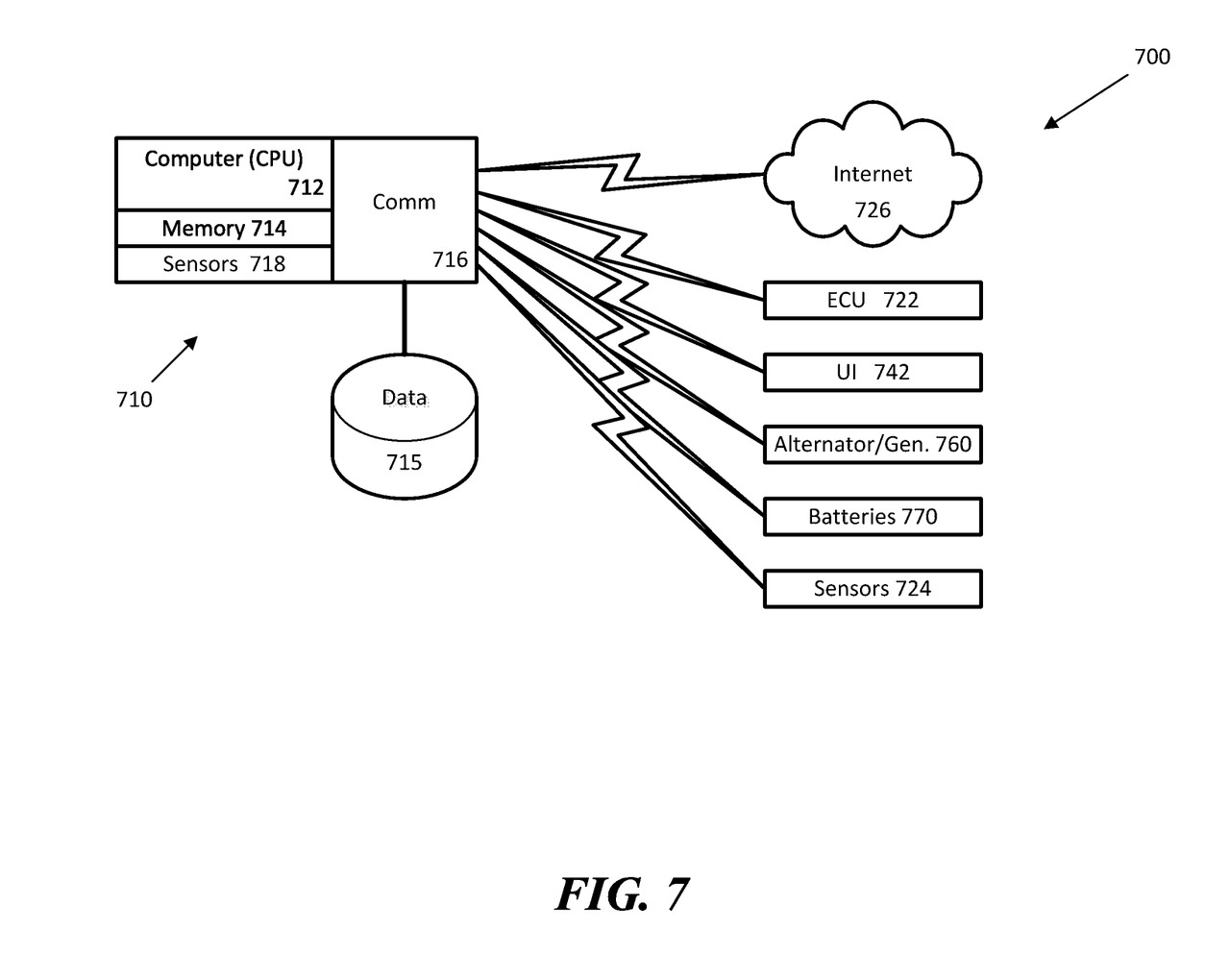
FIG. 7 is a diagrammatic view of a control system for an auxiliary power system for motor vehicle according to some embodiments of the invention.

FIG. 7 shows a diagrammatic view of an APU control system 700 according to some embodiments of the invention. The APU control system 700 can include a controller 710 that can be connected to a network 726, the engine control unit (ECU) 722, a user interface (UI) 742, the power generator 760, the APU battery pack 770 and external sensors 724. The controller 710 can include one or more computers, which include a central processing unit (CPU) 712 and associated memory components 714 (e.g., volatile and non-volatile memory devices), one or communication facilities 716 (e.g., wired and/or wireless communication ports, such as radio communications, Cellular data, WiFi, Blue Tooth, Zigbee, Ethernet, I2C, Serial I/O, SPI—Serial Peripheral Interface) that enable the controller 710 to communicate with external devices and systems. The controller can also include data storage 715 for storing data used by the controller 710 during its operations as well as for logging performance data for later analysis.

In accordance with some embodiments, the controller 710 can be connected to a network 726, such as a WiFi network, a cellular mobile data network, a wide area network, a satellite communication network, and/or a mesh communication network, that can optionally connect the controller 710 to the internet. This connection can be used to transfer logged performance data or real time data to a remote system for analysis (e.g., real time analysis or later analysis).

In accordance with some embodiments of the invention, the controller 710 can access enhanced map data (e.g., roads and route information, road gradient information, traffic information and weather information) that can be stored in local memory 714 as well as accessed remotely (e.g. from public and private Internet sources) through the communication facilities 716. In accordance with some embodiments, the controller 710 can include a software based algorithm that optimizes the energy taken from the drive line by selecting the times during the route when power is coupled to the generator/alternator 760 and the system is freewheeling (e.g., deriving no power and no load on the drive shaft). The algorithm can use intelligent maps and gradient information in combination with route information, traffic information, and weather information to determine optimal periods for engagement/dis-engagement of the system, including the freewheel, adding and subtracting engine braking to optimize energy capture, and driver safety. In accordance with some embodiments, selectively applying a charge or potential to the alternator (e.g., stator) selectively creates mechanical resistance (e.g., for braking) and electricity output to charge the batteries. In accordance with some embodiments, the computer controller can be used to selectively engage the power unit based on system sensors (e.g., one or more accelerometers and/or gyros) to selectively control resistance to drive line and an electronic or e-Jake braking system.

In accordance with some embodiments, the controller 710 can be programmed to recognize (e.g., based on accelerometer, gyroscope, GPS, and/or topographical data) the movement of the motor vehicle on a hill and/or mountain gradient in accent or decent. In accordance with some embodiments, the controller 710 can use accelerometer and/or gyroscope data to determine the trucks angle of decent/ascent and to control the level of resistance the system adds to the driveline to achieve performance goals (e.g., increase fuel economy and/or increase electricity generation). For example, the controller 710 can monitor the accelerometer (and/or gyro) data and determine an inclination angle (e.g. an angle of descent or ascent) and if angle of descent is above a predefined threshold, (e.g., a 3% grade) the controller can selectively engage the generator or alternator to increase the resistance to the drive shaft rotation thereby adding a braking effect to the vehicle and optimizing the energy recapture from the kinetic energy of the moving vehicle as it descends a hill thereby increasing the amount of electrically stored in the battery array while promoting the safe operation of the motor vehicle (e.g., reduces the wear and overheating of vehicle braking systems). This also optimizes fuel economy as the controller can selectively engage the generator or alternator only when the vehicle is moving down hill and optionally, not using engine power, either allowing the engine to idle or disengage the engine in free wheel mode.

In addition, in accordance with some embodiments, the controller 710 can use the network connections 726 to update its firmware and software, execute the software including remote system diagnostics, and monitor system status including system output, location, temperature, battery status, vehicle speed, weight, etc. In accordance with some embodiments, the controller 710 can download all the necessary map, route, topographical (e.g., incline), traffic, weather and other data needed for a predefined trip to enable the control system 700 to operate during the trip (without having to retrieve data from a remote source while on the road). In addition, data associated with alternate routes and detours can also be stored to anticipate possible route changes due to traffic and/or weather conditions. In the event that the driver needs to change the route and additional data is needed, the control system 700 can be connected using a wired or wireless data source (e.g., Ethernet, cellular data, WiFi, Blue Tooth, Zigbee, etc.) to obtain addition date. In accordance with some embodiments, the control system can also obtain data by tethering off of a mobile telephone of the operator (or a passenger) or a fleet radio communication system.

In accordance with some embodiments, the controller 710 can be connected to the engine control unit (ECU) 722 to monitor the performance of the motor vehicle engine 220, 320, 420, 520 can control. The controller 710 can be connected to the power generator 760 to control when the power generator 760 is drawing power from the drive shaft or the transmission. In accordance with some embodiments of the invention, the generator gear or pulley 262, 362 can include a clutch that can be selectively engaged or disengaged by the controller 710. In accordance with some embodiments of the invention, the power generator 260, 360 can be electrically connected or disconnected from the charging load by the controller 710. In operation, for example, the controller 710 can optimize the APU battery charging function to increase fuel economy of the engine by selectively disengaging the charging function and power load on the drive train when the engine is running in a low efficiency mode, such as accelerating (e.g. the vehicle accelerator pedal is pressed or the measured fuel economy is low) or moving up an incline (e.g., accelerometer data indicates upward motion) and selectively engaging the charging function and power load on the drive train when the engine is running in a high efficiency mode, such as decelerating (e.g. the vehicle accelerator pedal is depressed, the brake is pressed or the measured fuel economy is high) or moving down an incline (e.g., accelerometer data indicates downward motion), and for regenerative braking. In accordance with some embodiments of the invention, the controller can use map and/or terrain data (e.g., such as stored in data storage 715 to anticipate performance modes and engage or disengage the charging load depending upon whether the motor vehicle will be moving up or down an incline and the degree of incline. In accordance with some embodiments of the invention, the controller can periodically (e.g., according to a predefined duty cycle) engage and then disengage the generator or alternator to modulate the load on the drive train and more finely control the resistance applied to the drive train. Alternatively, the controller can control the voltage applied to the stator of the generator or alternator to control the load on the drive train.

In accordance with some embodiments of the invention, the controller 710 can be connected to a user interface (UI) 742, such as a control panel in the dashboard of the motor vehicle that enables the operator to control the operation of the APU charging system. The control panel UI 742 can include one or more buttons or switches that place the APU charging system into predefined operating modes (e.g., on, off, maximum charge, maximum fuel economy). The control panel UI 742 can include a touch screen user interface that provides user interface elements for controlling predefined operating modes of the system (e.g., on, off, maximum charge, maximum fuel economy) as well as allows the operator to adjust the parameters of the operating modes. The UI 742 can also include indicators (e.g., light and/or sound generating components) that provide operator with status information (e.g., APU charging or not charging status, battery charge level) as well as warning information (e.g., error conditions such as not charging, over-charged or no battery, or system failures such as generator not working or battery failure). In accordance with some embodiments, the UI 742 can be provided using a smart phone or a cockpit mounted GPS unit.

In accordance with some embodiments, the controller 710 can be connected to the power generator 760 and the APU battery pack 770 to monitor the status and performance of the power generator and the APU battery pack 770. In accordance with some embodiments of the invention, the controller 710 can control the charging function (e.g., when the batteries are being charged, the rate of charge, and maintaining charge, such as by trickle charging) during a trip. In accordance with some embodiments, the controller 710 can include a map function that enables the operator to input a destination and optionally devise a route of travel and the controller can determine a charging profile that includes the segments of the trip when power is taken from the drive train to charge the APU batteries to optimize fuel efficiency as well to achieve a maximum battery charge level or an operator defined battery charge level.

In accordance with some embodiments of the invention, the operator can specify the duration of APU battery power needed for an anticipated stop and the system can determine the APU battery charge level needed to operate for the specified duration. For example, an operator can specify a destination and a stop duration (e.g., 8 hours) and comfort parameters (e.g., heating or cooling) and the controller can determine a minimum APU battery charge level to meet the comfort requirements for the specified duration and the determine a charging plan or profile to be executed during the travel to the destination (and, for example, stop charging the batteries when a specified charge level has been achieved prior to reaching the destination). The controller 710 can also provide an indication or notification to the operator (e.g. during travel or at the destination) as to whether the APU system has sufficient charge to meet the specified charge needs. In accordance with some embodiments, at least some of the comfort parameters can be determined from remote data sources, such as weather data sources, weather forecasts, location information and the time of year.

In accordance with some embodiments of the invention, the controller 710 can be connected external sensors (or systems that provide access to sensor data, such as a smart phone or mobile GPS device) such as accelerometers, gyroscopes, temperature sensors, tire pressure sensors, fuel level sensors, inclination sensors and GPS devices that provide sensor information to the controller 710 to enable the controller 710 to further optimize the operation of the motor vehicle system and the APU charging system. Thus, for example, fuel level information, can be used in combination with weather (or temperature) and map (or geolocation) data to ensure that the engine is operated at a high enough efficiency level to enable the motor vehicle to travel to the next refueling station without running out of fuel, such as by disengaging any charging loads (including the engine alternator) on the engine that might reduce the fuel consumption such that the motor vehicle runs out of fuel before reaching the next refueling station. In accordance with some embodiments, the map or geolocation and traffic data or inclination or accelerometer data can be used to put the power generator 760 in a braking mode that increases the load on the drive train to provide additional braking power on inclines or in traffic congestion to better control the motor vehicle.

In accordance with some embodiments of the invention, the performance of the motor vehicle including fuel efficiency and the ability to charge the APU power system can be logged on a route by route basis or on a segment by segment basis for each trip made by the motor vehicle. This performance information can be uploaded through a network 726 to a central control system that aggregates the performance data for more than one motor vehicle. This performance data can be analyzed to identify routes and/or segments of the route that provide better fuel efficiency and/or better opportunities for charging the APU battery systems and associate a performance, priority and/or ranking value for each. The performance, priority and/or ranking value information can be downloaded to the controller 710 and used by the controller 710 to select routes and route segments for travel.

In accordance with some embodiments of the invention, the power generator can be used to provide braking assistance. When the operator removes their foot from the accelerator (e.g., the gas pedal) the engine acts as a brake and begins to slow the vehicle. Some long haul trucks are equipped with engine brakes (e.g., a Jake brake) that increase the resistance the engine has on the forward motion of the vehicle by reducing the compression in the engine cylinders. Given the weight characteristics of class 8 trucks this is often a desirable outcome. In accordance with some embodiments of the invention, a braking effect can be provide by controller 710 and the braking effect of the system can be amplified as desired to create an electric "Jake" brake, for example, by adding an additional charge or load to the power generator, increasing the resistance in the generator and subsequently creating more electricity.

However, the engine's resistance to forward movement during periods when the operator has removed their foot from the gas pedal can also restricts the amount of energy that can be recaptured for the creation of electricity. To overcome this loss of energy and fuel economy, motor vehicle transmission can include a free wheel or an overrunning clutch that disengages the driveshaft, which decouples the engine from the transmission, eliminating the engine brake effect. The truck at this point is moving with a force determined by the mass and velocity of the vehicle slowed only by the resistance of rolling factors like the negligible resistance of the tires on the pavement. In accordance with some embodiments of the invention, simultaneous with the overrunning clutches disengagement of the transmission from the engine, the electronic braking through the power generator can be engaged which benefits from the increase in force available to spin the power generator and increase the amount of electricity generated. In this embodiment, the braking effect of the power generator replaces the braking effect of the engine.

In accordance with some embodiments of the invention, the addition of a freewheel "auto clutch" system to the transmission of the motor vehicle allows the operator to select the mode of operation (either through an electronic switch or a mechanical lever which engages and disengages the use of the freewheel) allowing for the operator to increase the regenerative capacity of the systems through the use of the freewheel system.

By its nature, a freewheel mechanism acts as an automatic clutch, making it possible to change gears in a manual gearbox, either up- or downshifting, without depressing the clutch pedal. The freewheel system can, for example, be engaged or disengaged by the operator by pushing or pulling a lever. This will lock or unlock the main shaft with the freewheel hub. The freewheel can produce better fuel economy on carbureted engines (without fuel turn-off on engine brake) and less wear on the manual clutch, but can lead to more wear on the brakes as there is no longer the ability to perform engine braking. This can make freewheel transmissions dangerous for use on motor vehicles driven in mountainous regions, as prolonged and continuous application of brakes to limit vehicle speed can lead to brake-system overheating and potentially total system failure. Systems according to the present invention can use the power generator to replace the engine as a brake, saving fuel and slowing the vehicle by engaging the electric motors/alternators which adds resistance to forward motion of the motor vehicle without expending fuel. The force captured can be used to generate electricity which increase the overall efficiency of the system.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

The invention claimed is:

1. An auxiliary power system for a motor vehicle comprising:
   an engine connected to a transmission and a drive shaft connecting the transmission to a differential whereby rotational power of the engine is transmitted to rotate one or more drive wheels;
   a frame supporting the engine;
   a generator directly mounted to the drive shaft, wherein the generator includes a magnetic rotor coupled to the drive shaft and configured to rotate with respect to the drive shaft and a stator configured to surround the magnetic rotor and generate electrical energy from the rotating magnetic rotor,
wherein the stator is supported by a support bearing, the support bearing comprising an inner race coupled to the drive shaft and an outer race coupled to the stator.

2. The auxiliary power system according to claim 1, wherein the magnetic rotor is directly mounted on the drive shaft to rotate with the drive shaft.

3. The auxiliary power system according to claim 1, wherein the frame is coupled to the support bearing.

4. The auxiliary power system according to claim 1, wherein the outer race of the support bearing is coupled to the frame by a support housing and the outer race of the support bearing is supported by a support bushing within the support housing.

5. The auxiliary power system according to claim 1, further comprising at least a second bearing.

6. The auxiliary power system according to claim 1 further comprising
a controller connected to the generator and controlling at least one mode of operation of the generator.

7. The auxiliary power system according to claim 6 wherein the controller is connected to one or more sensors and the controller is configured to control the generator as a function of at least one of the one or more sensors.

8. The auxiliary power system according to claim 7 wherein the controller is connected to an accelerometer and receives acceleration data from the accelerometer; and wherein the controller controls the generator to generate power when the accelerometer data indicates that the accelerometer has an inclination angle greater than a predefined threshold.

9. The auxiliary power system according to claim 8 wherein the controller controls the generator to stop generating power when the accelerometer data indicates that the accelerometer has an inclination angle less than a predefined threshold.

10. The auxiliary power system according to claim 7 wherein the controller is connected to an accelerator pedal position sensor and receives accelerator position data from the accelerator pedal position sensor; and wherein the controller controls the generator to generate power when the accelerator position data indicates that the accelerator pedal is depressed.

11. The auxiliary power system according to claim 10 wherein the controller controls the generator to stop generating power when the accelerator position data indicates that the accelerator pedal is pressed.

12. The auxiliary power system according to claim 6 wherein the controller is connected to an engine control unit (ECU) of a motor vehicle and receives ECU data from the ECU; and wherein the controller controls the generator to generate power when the ECU data indicates that the motor vehicle is operating in a high efficiency mode.

13. The auxiliary power system according to claim 12 wherein the controller controls the generator to stop generating power when the ECU data indicates that the motor vehicle is operating in a low efficiency mode.

14. The auxiliary power system according to claim 6 wherein the controller is connected to a global positioning system (GPS) of a motor vehicle and receives GPS data from the GPS; and wherein the controller controls the generator to generate power when the GPS data indicates that the motor vehicle is moving down an incline.

15. The auxiliary power system according to claim 14 wherein the controller controls the generator to stop generating power when the GPS data indicates that the motor vehicle is moving up an incline.

* * * * *